Nov. 9, 1965  R. F. WILLIAMS  3,216,759
WINDOW GUIDE ROLLER ASSEMBLY
Filed July 12, 1963  3 Sheets-Sheet 2
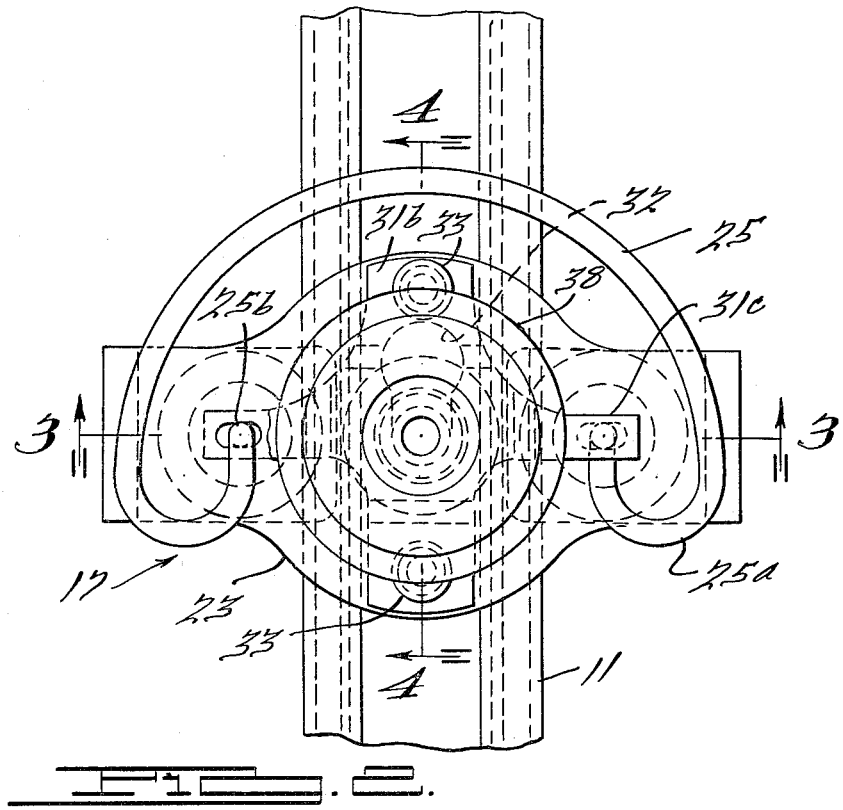
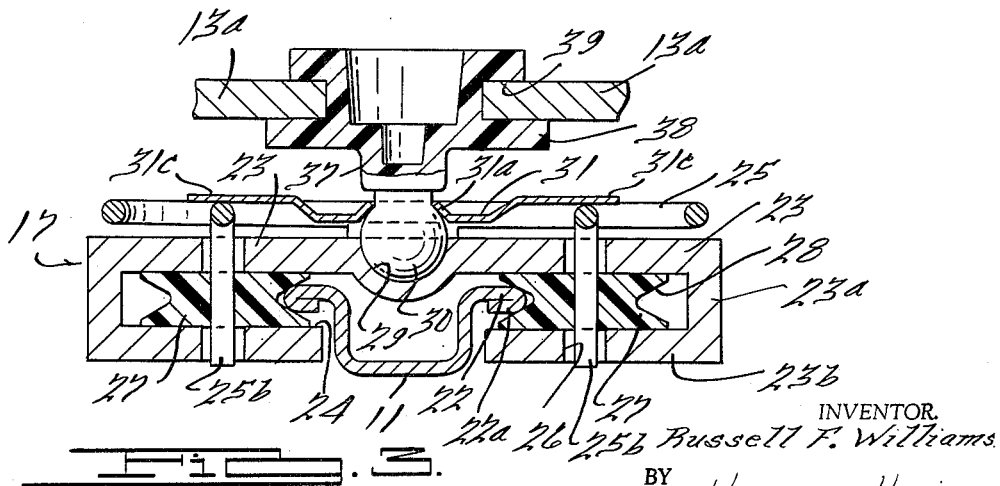
INVENTOR.
Russell F. Williams
BY Harness & Harris
ATTORNEYS

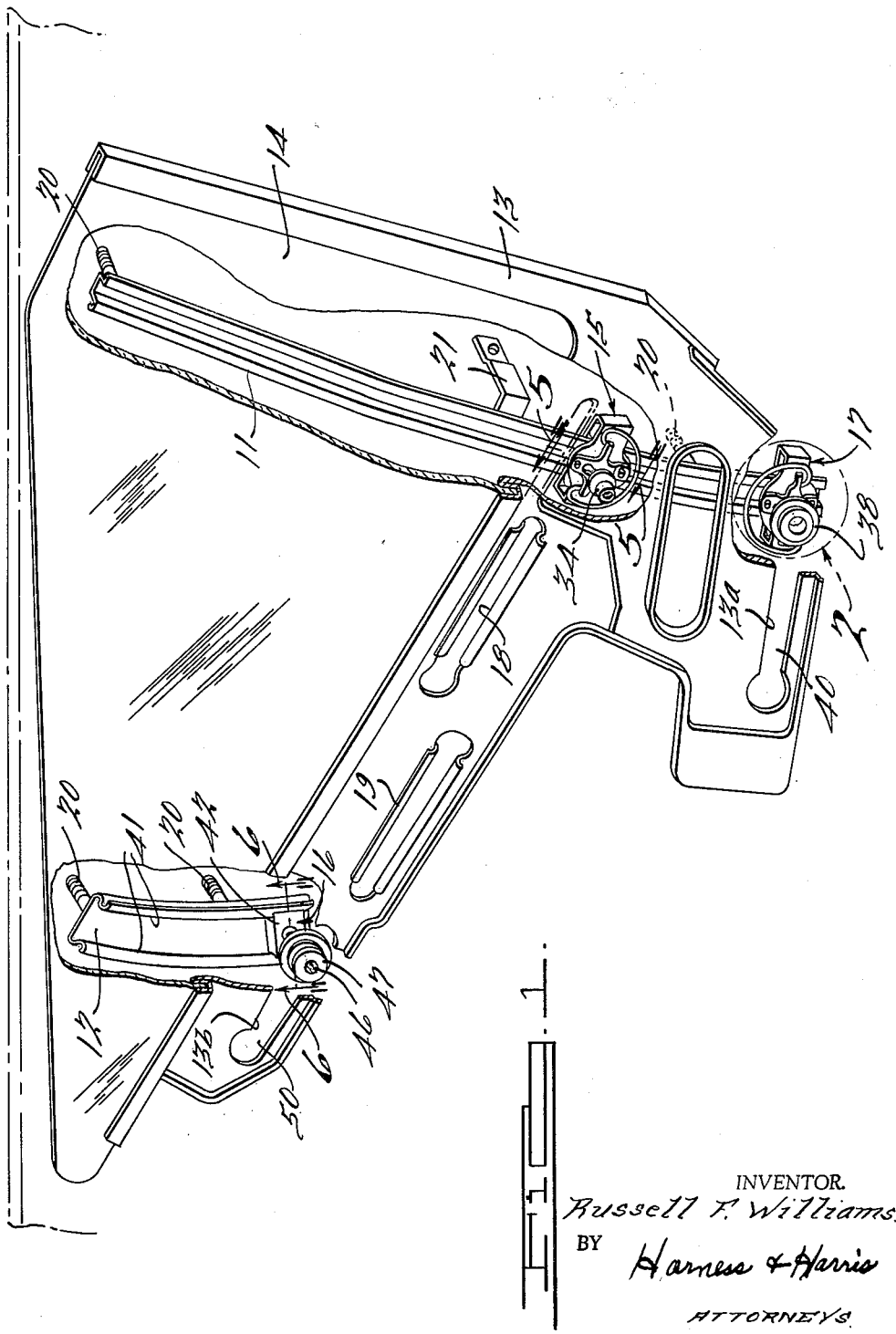

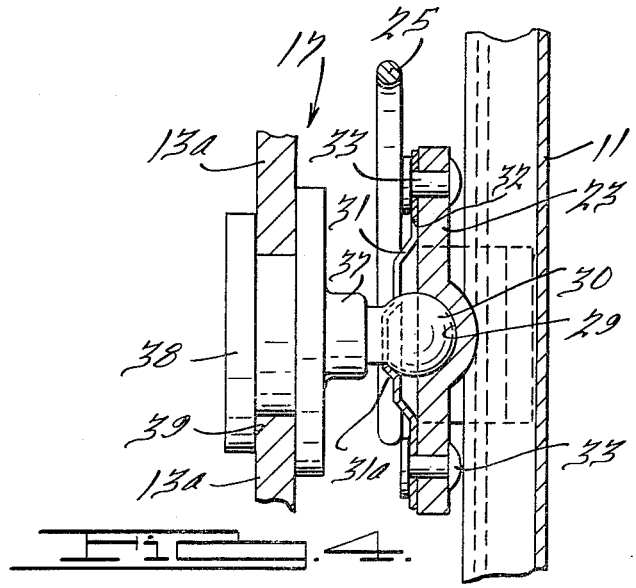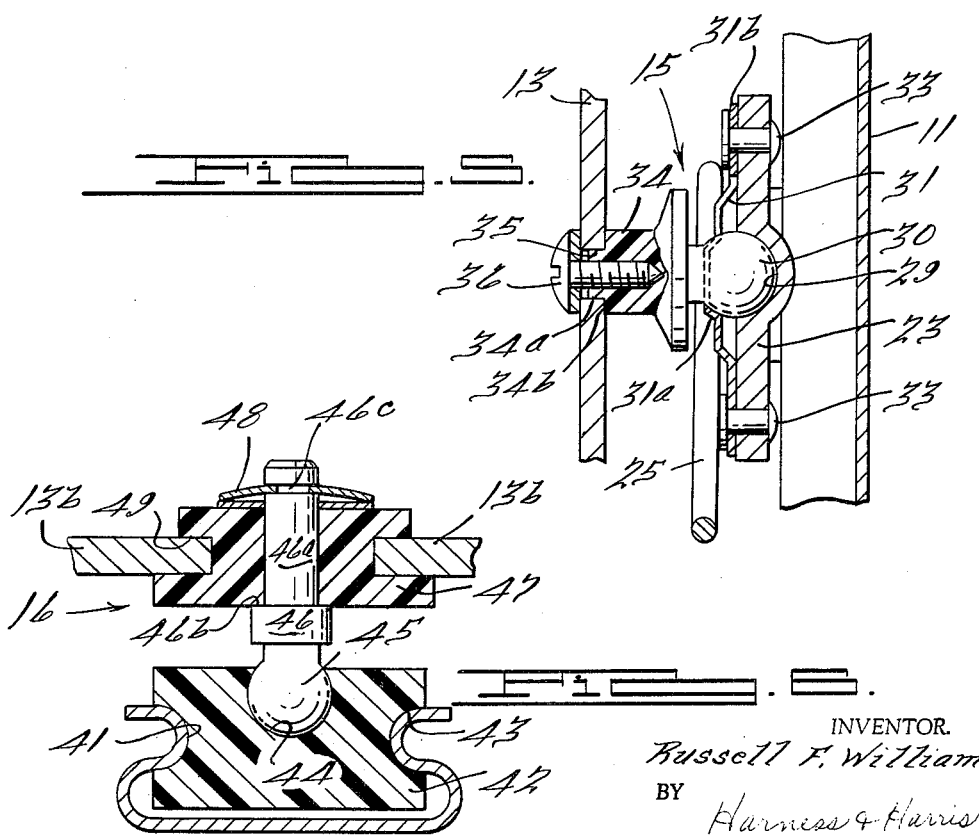

United States Patent Office 3,216,759
Patented Nov. 9, 1965

3,216,759
WINDOW GUIDE ROLLER ASSEMBLY
Russell F. Williams, 1502 Longfellow Ave.,
Royal Oak, Mich.
Filed July 12, 1963, Ser. No. 294,510
5 Claims. (Cl. 296—44.5)

This invention relates to improvements in means for supporting and guiding the movement of a window panel for an automobile body and has for an important object the provision of an improved support and guide means for the curved drop window of a rear quarter panel or rear door of a hard top convertible type automobile, for example, wherein the upper portions of the window panel are unsupported by a door or body frame.

Prior efforts to provide a stable support for such a window, particularly where a compound vertical, horizontal and swinging movement was required to jockey the curved window around a body frame structure, resulted in too much friction and cranking effort in raising and lowering the window. It is accordingly another object to provide an improved assembly in a window panel and guide support of the above character which is comparatively simple and economical in construction, yet which efficiently supports the window and enables the latter to be raised or lowered with a minimum of effort.

Another and more specific object is to provide such an assembly comprising a pair of upright guide tracks secured to the body structure, at least one of the tracks being curved or bowed to guide the curved window in a desired compound movement. A pair of follower means interengage the curved track at locations spaced longitudinally thereof. One of the follower means is connected to the window frame to maintain itself in transverse alignment with respect to the curved track upon movement along the latter. The other follower means is interengaged with a separate transverse track for guided movement therealong in directions transversely of the associated upright guide track, the transverse track being fixedly secured to the window frame. By such a construction, the window frame is secured to the upright guide tracks which in turn are secured to the automobile body structure.

Each follower means comprises a bracket extending transversely of the guide track and having a pair of track following rollers interengaged opposite sides of the guide track. A C-shaped wire spring associated with the pair of rollers terminates at opposite ends extending axially of the rollers. The rollers are journalled on the ends of wire spring extensions and are yieldingly urged thereby against the opposite sides of the track.

A socket is provided in each bracket between its pair of rollers to receive the ball head of a ball headed stud. The stud of the aforesaid one follower means is connected to the window frame. The stud of the other follower means carries a third track following roller which comprises the interengagement between the associated follower means and transverse track and is interconnected with its transverse track to move therealong in guided relation and also to provide a positive connection between the latter track and associated upright guide track. A separate resilient clamp having a collar portion and two pairs of oppositely directed arms or wings is arranged around the axis of each shaft in seated engagement against the associated ball head. A pair of the wings of each resilient means overlie the spring to limit displacement of its ends from the slots in the bracket. The other pair of arms extend transversely to the first named wings and are secured to the associated bracket to yieldingly urge the collar against the ball head and hold the latter seated within its socket, thereby to complete a universal coupling between each bracket and its associated stud.

The bracket of the aforesaid one follower means is connected to the window frame at a location between its rollers. The other bracket has a third track following roller journalled thereon at a location between the associated first named pair of rollers. The third roller comprises the interengagement between the associated follower means and transverse track and is interconnected with its transverse track to move therealong in guided relation and also to provide a positive connection between the latter track and associated upright guide track.

By virtue of such a construction, the bracket of each follower means is free to swing about its universal coupling, thereby to enable each bracket to maintain a desired alignment transversely of the associated upright guide track upon movement therealong. Thus binding and frictional engagement between the roller and track are minimized.

Another object is to provide an improved vehicle window guide for the frame of a curved window comprising a comparatively short bowed guide track and a comparatively long bowed guide track, whereby as the window frame is raised or lowered, it will also be swung appreciably about an axis movable along the short guide track. In this construction a pair of follower means spaced longitudinally of the longer guide track engage the latter to ride therealong, a single or third follower means engages the shorter guide track to ride therealong.

Each follower means comprises a bracket or body and a stud universally coupled with the bracket or body. The stud of one of the pair of follower means is firmly secured to the window frame to maintain its ball head in fixed relationship with respect to the frame. The other two studs terminate in roller followers pivotally engaging transverse tracks carried by the frame and extending transversely of the first named two guide tracks, each roller follower being adapted to ride along its transverse track in guided relation and to pivot about the axis of its stud to enable the aforesaid swinging of the window frame and also pivoting thereof about the axis of the stud secured to the frame. By virtue of such an arrangement, in cooperation with the ball-and-socket type universal couplings between the follower brackets and their associated studs, a rattle proof window guide assembly is achieved which positively guides raising and lowering movement of the window frame with a minimum of friction.

Other objects of this invention will appear in the following description and appended claims, reference being had to the accompanying drawings forming a part of this specification wherein like reference characters designate corresponding parts in the several views.

FIGURE 1 is a fragmentary elevational view of a vehicle window panel and guide means embodying the present invention.

FIGURE 2 is an enlarged fragmentary view showing the structure within the circle 2 of FIGURE 1.

FIGURE 3 is a fragmentary sectional view through the pivotal follower, taken in the direction of the arrows substantially along the line 3—3 of FIGURE 2.

FIGURE 4 is a fragmentary sectional view taken in the direction of the arrows substantially along the line 4—4 of FIGURE 2.

FIGURE 5 is a fragmentary enlarged sectional view taken in the direction of the arrows substantially along the line 5—5 of FIGURE 1.

FIGURE 6 is a fragmentary enlarged sectional view taken in the direction of the arrows substantially along the line 6—6 of FIGURE 1.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to the drawings, a particular embodiment of the present invention is illustrated by way of example in a roller guide mechanism for the window of a vehicle rear door or quarter panel on which are mounted a pair of generally upright fixed guide tracks 11 and 12. The tracks 11 and 12 are connected to a shiftable supporting frame 13 of a window panel 14 by means of a pivotal follower 15 and two transversely shiftable followers 16 and 17.

In the present instance the window panel 14 has a circular cylindrical curvature from front to rear in FIGURE 1 with a radius of approximately 90". The tracks 11 and 12 have a similar curvature. The frame 13 is raised and lowered by a window regulator means which may be conventional and which interengages the frame 13 in guide slots 18 and 19. The window regulator effects the opening and closing movement of the window, the tracks 11 and 12 serving merely to guide this movement. The tracks 11 and 12 are secured to the vehicle body by means of a plurality of studs 20 spaced longitudinally of the tracks. An intermediate support 21 is provided between the studs 20 for the longer track 11 to maintain a desired fixed spatial relationship between the track 11 and the vehicle body.

The track 11 comprises an outwardly opening channel having laterally directed side flanges 22 doubled back at 22a for reinforcement. Each follower for track 22 comprises an aluminum cast body or bracket 23, FIGURES 2-4, located outwardly of the track 11 with respect to the vehicle body and having opposite end flanges 23a directed inwardly toward the track 11. The flanges 23a terminate in inturned flanges 23b to form a pair of channels 24 extending longitudinally of the track 11 at opposite sides thereof and opening to receive the flanges or track portions 22. A clam-shaped or C-shaped wire spring 25 is provided adjacent the outer surface of the bracket 23 opposite the track 11. The opposite ends of the spring 25 curve reversely at 25a in the plane of the C and terminate in spindle ends 25b extending perpendicularly to said plane through aligned lost motion slots 26 in the bracket 23 at opposite sides of the channel 24. A pair of follower rollers 27 journalled on the ends 25b respectively are contained within the channels 24 and are provided with circumferential V-grooves 28 in rolling interengagement with the oppositely directed track portions 22 respectively. The spring 25 is under tension urging its ends 25b toward each other to cause the rollers 27 to grip the track 11 therebetween.

Between the slots 26, the outer surface of each bracket 23 is provided with an outwardly opening spherical socket 29 within which is seated the spherical ball element or head 30 of a ball head type stud. A leaf type spring 31 is provided with a key-hole slot 32 having at its smaller portion a circular collar 31a of the spring 31, the collar 31a being flared outwardly and being seated snugly against the ball element 30. The large portion of key-hole slot 32 is dimensioned to enable passage of the ball head 30 to facilitate assembly or replacement of the parts. The axis of key-hole slot 32 extends perpendicularly to a line connecting the most motion slots 26 and is parallel to a pair of oppositely directed spring arms 31b of the spring 31. The arms 31b are offset toward the bracket 23, FIGURE 4, and are secured thereto, as for example by rivets 33, under tension yieldingly urging the collar portion 31a against the ball 30 to hold the latter seated within its mating socket 29. Extending in opposite directions perpendicularly to the arms 31b are a pair of resilient wings 31c of the spring 31 which overlie the incurved spring portions 25a adjacent the spindle ends 25b to prevent displacement of the latter from the slots 26.

The stud 34 of the uppermost follower 15 terminates in a reduced portion 34a to provide a shoulder 34b abutting the inner surface of frame 13. The reduced portion 34a extends snugly within a mating opening 35 in frame 13 and is secured therein by a screw 36. The stud 37 of the lowermost follower 17 terminates in an integral roller follower 38 having a peripheral groove 39 therein engaging the opposite edges 13a of a transverse guide slot 40 extending in frame 13 transversely of track 11. The ball element 30, stud 37 and follower 38 are preferably cast as a unitary structure, the groove 39 being formed to snugly engage the opposite edges 13a in rolling contact to enable guided movement of the follower 38 along the transverse slot or track 40 in accordance with pivoting of frame 13 during raising or lowering thereof.

The guide track 12 also comprises a channel structure opening outwardly with respect to the vehicle body and formed with rounded inbent channel sides or rails 41 for a sliding bracket or follower 42. Opposite sides of the bracket 42 are provided with grooves 43 which snugly receive the rails 41 in sliding engagement to effect guided movement of the follower 42 along the track 12. The outer surface of bracket 42 is provided with an outwardly opening spherical socket 44 having the ball head 45 of a ball head type stud 46 seated therein. The stud 46 terminates in a reduced portion 46a to provide a shoulder 46b against which is seated a roller follower 47 journalled on the reduced portion 46a. Outwardly of the follower 47, the stud 46 is notched at 46c to receive a spring clip 48 so as to retain the stud 46 and follower 47 in the assembled relation shown.

The outer periphery of the roller 47 is also provided with an annular groove 49 which snugly receives the opposite edges 13b of a transverse guide slot 50 extending within frame 13 transversely of track 12. Similarly to the groove 39 in follower 38, the groove 49 is provided to enable guided rolling movement of the roller 47 along the track edges 13b upon swinging of frame 13 during raising or lowering of the window panel 14.

By the construction shown the axes of the rollers 38 and 47 are held perpendicular to the frame 13 by virtue of the snug confinement of the edges 13a and 13b within the mating annular grooves of the rollers. Similarly shaft 34 is maintained perpendicular to frame 13 by reason of its attachment thereto. No play or lost motion need be provided in these parts to accommodate the curvature of the tracks 11 and 12 because the ball-and-socket type universal connections of the studs 34, 37 and 46 with their respective follower brackets 23 and 42 enable twisting of these brackets as required while moving along the tracks 11 and 12. The arrangement of the leaf springs 31 maintains the balls 30 firmly against their socket seats 29 and also holds the assembly of the springs 25, rollers 27, and brackets 23 together by virtue of the spring portions 31c overlying the spring ends 25a.

Having thus described my invention, I claim:

1. In a vehicle body having a pair of guide tracks secured thereto, a shiftable window frame, a pair of follower means associated with one of said guide tracks at locations spaced longitudinally thereof, a third follower means associated with the other of said guide tracks, each follower means interengaging the associated track to ride therealong in guided relation, a shaft secured to said frame at a location fixed with respect thereto and associated with one of said pair of follower means, a separate transverse track associated with each of the other of said follower means and secured to said frame to extend transversely of the guide track along which the associated follower means rides, a separate follower interengaging each transverse track to ride therealong in guided relation, and a separate universal coupling comprising ball-and-socket means interconnecting said shaft and said one follower means and also interconnecting each follower with one of each of said other follower means, each of said pair of follower means comprising a bracket having a pair of followers engaging opposite sides of the associated guide track to ride therealong in said guided relation, and the ball-and-socket connections with each of said pair of follower means having the socket of each connection in its bracket at a location between the corresponding pair of followers engaging opposite sides of said one guide track.

2. In a vehicle body having a guide track and a shiftable window frame; a pair of follower means associated with said guide track at locations spaced longitudinally thereof; each follower means comprising a bracket having a pair of rollers engaging opposite sides of the guide track to ride therealong in guided relation, a spring having a pair of ends extending axially of said rollers through lost motion slots in said bracket and through axial openings in said rollers respectively to comprise journals therefor, said spring being under tension urging said rollers against the opposite sides of said guide track, a socket in said bracket at a location between said rollers, a ball element seated in said socket, a shaft secured to said ball element, resilient means including a collar extending at least partially around the axis of said shaft and seated against said ball element, and means securing said collar to said bracket to urge said ball element resiliently into its seated position within said socket to complete a universal coupling between said bracket and shaft; said resilient means having a pair of oppositely directed wings overlying said spring at opposite sides of said socket respectively to limit axial displacement of said ends of said spring from said slots; the shaft of one of said follower means being secured to said frame at a location fixed with respect thereto, a transverse track carried by said frame to extend transversely of said guide track, and a follower means on the shaft of the other of said follower means interengaging said transverse track to ride therealong in guided relation.

3. In combination, a guide track, follower means comprising a bracket and a pair of rollers engaging opposite sides of said track to ride therealong in guided relation, a wire spring having a body portion terminating in a pair of ends extending at right angles to the body portion and projecting through lost motion slots in said bracket and through axial openings respectively in said pair of rollers to comprise journals for said rollers, said spring being under tension urging the rollers journalled thereon against the opposite sides of said track, a socket in said bracket between said slots, a shaft having a ball head seated in said socket, resilient means secured under tension to said bracket and including a collar around the axis of said shaft and engaging said ball head to urge the same yieldingly into said socket to complete a universal coupling between said shaft and bracket, said spring body portion confronting the surface of said bracket which in turn confronts said collar, said resilient means also including a pair of wings overlying said spring body portion at opposite sides of said socket to limit axial displacement of said ends from said slots.

4. In combination, a guide track, follower means comprising a bracket and a pair of rollers engaging opposite sides of the said track to ride therealong in guided relation, a wire spring having a body overlying said bracket and terminating in a pair of ends extending through lost motion slots in said bracket and through axial openings respectively in said pair of rollers to comprise journals for said rollers, said spring being under tension urging said rollers against the opposite sides of said track, a socket in the surface of said bracket confronting said spring body and located between said slots, a shaft having a ball head seated in said socket, resilient means including a collar around the axis of said shaft and engaging said ball head, said resilient means including a pair of arms extending in opposite directions transversely to a line joining said slots and secured under tension to said bracket to urge said ball head yieldingly into said socket to complete a universal coupling between said shaft and bracket, said resilient means also including a pair of wings overlying said spring at opposite sides of said socket to limit axial displacement of said pair of ends from said slots.

5. In a vehicle body having a fixed guide track and a shiftable window frame, a pair of follower means associated with said guide track at locations spaced longitudinally thereof, each follower means comprising a bracket having a pair of followers engaging opposite sides of said guide track to ride therealong in guided relation, a shaft secured to said frame at a location fixed with respect thereto and associated with one of said pair of follower means, a transverse track associated with the other of said follower means and secured to said frame to extend transversely of the guide track, a follower interengaging said transverse track to ride therealong in guided relation, and a separate universal coupling comprising ball-and-socket means interconnecting said shaft and said one follower means and also interconnecting said follower with said other follower means, and the ball-and-socket connections with each of said pair of follower means having the socket of each connection in its bracket at a location between the corresponding pair of followers engaging opposite sides of said guide track.

References Cited by the Examiner
UNITED STATES PATENTS

| | | | |
|---|---|---|---|
| 2,901,244 | 8/1959 | Jones | 296—44 X |
| 2,945,691 | 7/1960 | Swift | 268—124 |
| 3,078,120 | 2/1963 | Faber | 296—44.5 |

MILTON BUCHLER, *Primary Examiner.*

A. HARRY LEVY, *Examiner.*